United States Patent
Marek et al.

(10) Patent No.: US 11,054,332 B2
(45) Date of Patent: Jul. 6, 2021

(54) METHOD FOR CHECKING THE LEAK TIGHTNESS OF A COMBUSTION ENGINE HAVING AN EXHAUST GAS TURBOCHARGER, AND EXHAUST GAS TURBOCHARGER

(71) Applicant: Bayerische Motoren Werke Aktiengesellschaft, Munich (DE)

(72) Inventors: Reinhard Marek, Lutherstadt Eisleben (DE); Stefan Stoeckl, Attenkirchen (DE); Tim Angerer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 867 days.

(21) Appl. No.: 14/863,737

(22) Filed: Sep. 24, 2015

(65) Prior Publication Data

US 2016/0011070 A1    Jan. 14, 2016

Related U.S. Application Data

(63) Continuation of application No. PCT/EP2014/059040, filed on May 5, 2014.

(30) Foreign Application Priority Data

May 27, 2013    (DE) .................. 10 2013 209 786

(51) Int. Cl.
| | |
|---|---|
| *G01M 3/02* | (2006.01) |
| *F02B 39/16* | (2006.01) |
| *F01D 17/10* | (2006.01) |
| *F02B 37/18* | (2006.01) |
| *G01M 15/04* | (2006.01) |
| *G01M 3/26* | (2006.01) |

(52) U.S. Cl.
CPC ............ *G01M 3/025* (2013.01); *F01D 17/105* (2013.01); *F02B 37/186* (2013.01); *F02B 39/16* (2013.01);
(Continued)

(58) Field of Classification Search
CPC ........ F02B 37/183; F02B 33/40; F02B 39/16; G01M 15/04; G01M 3/26
(Continued)

(56) References Cited

U.S. PATENT DOCUMENTS

| | | | |
|---|---|---|---|
| 2010/0095746 A1* | 4/2010 | Lund ................... | G01M 3/025 73/40.7 |
| 2012/0328416 A1* | 12/2012 | Igarashi ............... | F01D 17/105 415/159 |

(Continued)

FOREIGN PATENT DOCUMENTS

| | | |
|---|---|---|
| CN | 102822472 A | 12/2012 |
| CN | 102892994 A | 1/2013 |
| EP | 2 543 847 A1 | 1/2013 |

OTHER PUBLICATIONS

International Search Report (PCT/ISA/210) issued in PCT Application No. PCT/EP2014/059040 dated Nov. 27, 2014 with English-language translation (four (4) pages).

(Continued)

*Primary Examiner* — Ngoc T Nguyen
(74) *Attorney, Agent, or Firm* — Crowell & Moring LLP

(57) ABSTRACT

An exhaust gas turbocharger includes a housing having an exhaust gas inlet and an exhaust gas outlet. The exhaust gas turbocharger also has a turbine wheel rotatably mounted in the housing. The exhaust gas turbocharger includes a shut-off device that can adopt both an open and a closed state, a fluid connection existing in the open state and allowing exhaust gas which enters via the exhaust gas inlet to flow to the exhaust gas outlet, bypassing the turbine wheel. When the housing is supplied with compressed air, the exhaust gas turbocharger is at least substantially airtight.

19 Claims, 2 Drawing Sheets

(52) U.S. Cl.
CPC .............. *G01M 3/26* (2013.01); *G01M 15/04* (2013.01); *F02B 37/183* (2013.01); *F05D 2220/40* (2013.01)

(58) Field of Classification Search
USPC .......................................................... 60/602
See application file for complete search history.

(56) References Cited

U.S. PATENT DOCUMENTS

2013/0089411 A1* 4/2013 Ward .................... F01D 17/165
 415/151

2014/0174077 A1* 6/2014 Palaniyappan ....... F01D 17/105
 60/602

OTHER PUBLICATIONS

German-language Office Action issued in counterpart German Application No. DE 10 2013 209 786.7 dated Oct. 21, 2013 (six (6) pages).

Chinese Office Action issued in counterpart Chinese Application No. 201480022568.1 dated Feb. 15, 2017 with English translation (12 pages).

Chinese-language Office Action issued in counterpart Chinese Application No. 201480022568.1 dated Sep. 14, 2017 with English translation (11 pages).

\* cited by examiner

METHOD FOR CHECKING THE LEAK TIGHTNESS OF A COMBUSTION ENGINE HAVING AN EXHAUST GAS TURBOCHARGER, AND EXHAUST GAS TURBOCHARGER

CROSS REFERENCE TO RELATED APPLICATIONS

This application is a continuation of PCT International Application No. PCT/EP2014/059040, filed May 5, 2014, which claims priority under 35 U.S.C. § 119 from German Patent Application No. 10 2013 209 786.7, filed May 27, 2013, the entire disclosures of which are herein expressly incorporated by reference.

BACKGROUND AND SUMMARY OF THE INVENTION

The present invention relates to a method for testing the leak-tightness of an internal combustion engine, which has an exhaust-gas turbocharger, before the initial commencement of operation thereof, and to an exhaust-gas turbocharger having a housing which has an exhaust-gas inlet and an exhaust-gas outlet, a turbine wheel which is mounted in rotatable fashion in the housing, and a shut-off device which can assume an open and a closed state, wherein, in the open state, a fluidic connection is realized via which exhaust gas passing from the exhaust-gas inlet can flow to the exhaust-gas outlet while bypassing the turbine wheel.

Before the initial commencement of operation, internal combustion engines are normally tested for "leak-tightness". In this case, both the "oil space" and the "water space" are tested for leak-tightness by being charged with air. Testing is performed firstly on the "bare engine" (core engine without attachment parts) and on the "complete engine" (core engine with attachment components such as intake system, hoses, exhaust-gas turbocharger, etc.).

To limit the charge pressure at high engine speeds, exhaust-gas turbochargers normally have a bypass valve ("wastegate"). Above a particular charge pressure, the wastegate is opened by an actuator, which has the effect that a partial volume flow of the hot exhaust gas passing from the internal combustion engine is conducted past the turbine of the exhaust-gas turbocharger directly into the exhaust system. The wastegate is normally formed by a flap which is mounted pivotably in the housing of the exhaust-gas turbocharger. The pivot spindle, which is mounted in the housing, of the wastegate flap normally exhibits a certain degree of play. During testing of the leak-tightness of the finished engine, a not insignificant amount of air can escape via the "play" between the pivot spindle of the wastegate flap and the housing of the exhaust-gas turbocharger. This play is duly negligible with regard to the function of the exhaust-gas turbocharger and of the internal combustion engine themselves. However, the leakage airflow that escapes via the "mounting" of the wastegate flap has a disruptive effect during the leak-tightness testing of the finished engine and must be correspondingly "factored out". The "factoring out" may, on the one hand, be realized through the assumption of a blanket leakage value. This, however, leads to accuracy losses and to a blanket increase in the admissible leakage limit value.

As an alternative to this, it would be possible for the exhaust-gas turbocharger to be tested for leak-tightness by the turbocharger supplier. The leakage value is then, as it were, "supplied along with" the exhaust-gas turbocharger and is then factored out in the leak-tightness test of the finished engine. This, however, involves additional outlay for the supplier and for the vehicle manufacturer installing the exhaust-gas turbocharger. Furthermore, a loss in accuracy is to be expected because the testing conditions at the supplier do not necessarily exactly correspond to the testing conditions at the engine factory.

It is an object of the invention to provide a method for testing the leak-tightness of an internal combustion engine which has an exhaust-gas turbocharger, and an exhaust-gas turbocharger, with which the problem of a leakage air flow escaping via the pivot spindle of the wastegate flap is eliminated.

This and other objects are achieved in accordance with embodiments of the invention.

The invention is based on the concept of the "actuation device", by means of which a shut-off element of the shut-off device (wastegate) of the exhaust-gas turbocharger is actuated, being sealed off in air-tight fashion at least during the leak-tightness test, such that, during the leak-tightness test, no air can escape from the housing of the exhaust-gas turbocharger via the actuation device. Here, the term "escape from the housing of the exhaust-gas turbocharger" should not necessarily be understood literally. In principle, a leakage test could also be performed with "negative pressure" (rather than with positive pressure) in the engine. Then, any "leakage air" would flow from the surroundings into the engine and/or exhaust-gas turbocharger.

An exhaust-gas turbocharger according to the invention has a housing with an exhaust-gas inlet and an exhaust-gas outlet (the "fresh-air inlet" and the "fresh-air outlet" do not need to be discussed in any more detail here). Mounted in rotatable fashion in the housing is a turbine wheel which is connected via a shaft to a compressor wheel of the exhaust-gas turbocharger. The exhaust-gas turbocharger furthermore has a shut-off device (also referred to as a wastegate) which can assume an open state and a partially or fully closed state. In the open state of the shut-off device, a "fluidic connection" (bypass) exists via which hot exhaust gas of the internal combustion engine passing from the exhaust-gas inlet can flow to the exhaust-gas outlet while bypassing the turbine. Thus, when the shut-off device is open, a partial volume flow of the exhaust gas passing from the internal combustion engine can be conducted past the turbine wheel in order that, even in the presence of high engine speeds of the internal combustion engine, the rotational speed of the turbine wheel does not increase to too high a value.

With regard to the exhaust-gas turbocharger, an aspect of the invention consists in sealing off the exhaust-gas turbocharger when the housing is charged with compressed air, in order to—as far as possible—prevent air escaping from the housing of the exhaust-gas turbocharger at the shut-off device. It is thus the aim to achieve that the exhaust-gas turbocharger is air-tight or substantially or approximately air-tight when the housing is charged with compressed air. Here and at other points in the description, the term "substantially air-tight" or "approximately air-tight" mean that it may nevertheless be possible for very small amounts of air to escape.

In one refinement of the invention, the shut-off device (wastegate) has an "actuation device" or actuation mechanism. At least one component of the actuation device is arranged within the housing of the exhaust-gas turbocharger, and at least one component of the actuation device is arranged outside the housing or projects out of the housing. This may be a single component which extends through an opening of the housing. According to the invention, there is provided on the actuation device a sealing device which seals off the interior of the housing with respect to the exterior of the housing (surroundings) in at least approximately air-tight fashion.

As already indicated above, the shut-off device (wastegate) has a shut-off element (wastegate valve or wastegate flap) which can be actuated by means of an actuation element of the actuation device, which actuation element extends through a passage opening provided in the housing of the exhaust-gas turbocharger. The actuation element may, for example, be a spindle or a shaft. The spindle or shaft may, for example, be arranged pivotably in the housing. A shut-off element (for example, a flap) of the wastegate may be arranged on a spindle or shaft section which is situated in the housing. A lever may be arranged on a spindle or shaft end projecting out of the housing, which lever is acted on with a positioning force or a positioning moment by an actuator (for example, an electric motor).

In one refinement of the invention, it is provided that the sealing device bears against the actuation element of the actuation device and against the housing, or against the actuation element and against a bearing element which is fixedly connected to the housing. The bearing element may be formed, for example, by a bushing which is fixedly connected to the housing. The bushing may be pressed into the housing or fastened to the housing in some other way. In this case, the actuation element extends through the bushing and through a passage hole provided in the housing of the exhaust-gas turbocharger.

In a region in which the bearing element and the actuation element make contact with one another or face one another, in each case one encircling groove-like depression may be provided in the bearing element and in the actuation element, into which depression there is inserted a sealing element of the sealing device, for example an O-ring.

A groove-like depression may also be formed by virtue of a face side or a shoulder of the bearing element being spaced apart by the width of a gap from a face side or a shoulder of the actuation element.

Alternatively or in addition to this, a sealing device may be arranged between an outer circumference of the actuation element (spindle or shaft to which a flap of the wastegate is fastened) and an inner circumference of the passage opening provided in the housing of the exhaust-gas turbocharger. If, as described above, a bearing element is provided, the sealing device may also be provided between an outer circumference of the actuation element and an inner circumference of the bearing element (for example, a bushing).

Alternatively or in addition to this, it may be provided that the sealing device is arranged on or between a face side of a radially protruding shoulder of the actuation element and the housing, or on or between a face side of a radially protruding shoulder of the actuation element and a face side of the bearing element. In this case, the sealing device may be formed, for example, by a foil. To ensure that as far as possible no air can escape the shut-off device, it must be ensured that the sealing foil is clamped. This may be achieved by virtue of a clamping element being arranged on that section of the actuation element which protrudes out of the housing, which clamping element braces the shoulder of the actuation element against the housing.

In one refinement of the invention, it is provided that the sealing device has a seal which is provided in the "delivery state" of the exhaust-gas turbocharger, that is to say before the testing on the test stand at the engine factory and before the initial commencement of operation of the exhaust-gas turbocharger, and which is destroyed during the operation of the exhaust-gas turbocharger, that is to say when hot exhaust gas flows through the latter. The seal however need not imperatively be destroyed during operation if the exhaust-gas turbocharger functions correctly even with the seal.

The seal may be designed so as to be partially or entirely burned off by the hot exhaust gas. The seal is thus required only for the leak-tightness test, but not during the operation of the exhaust-gas turbocharger.

Ideally, the exhaust-gas turbocharger is already sealed off by the supplier of the exhaust-gas turbocharger and is then delivered in a sealed state to the engine factory. Alternatively, it would also be possible for the seal to be fitted for the first time at the engine factory.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
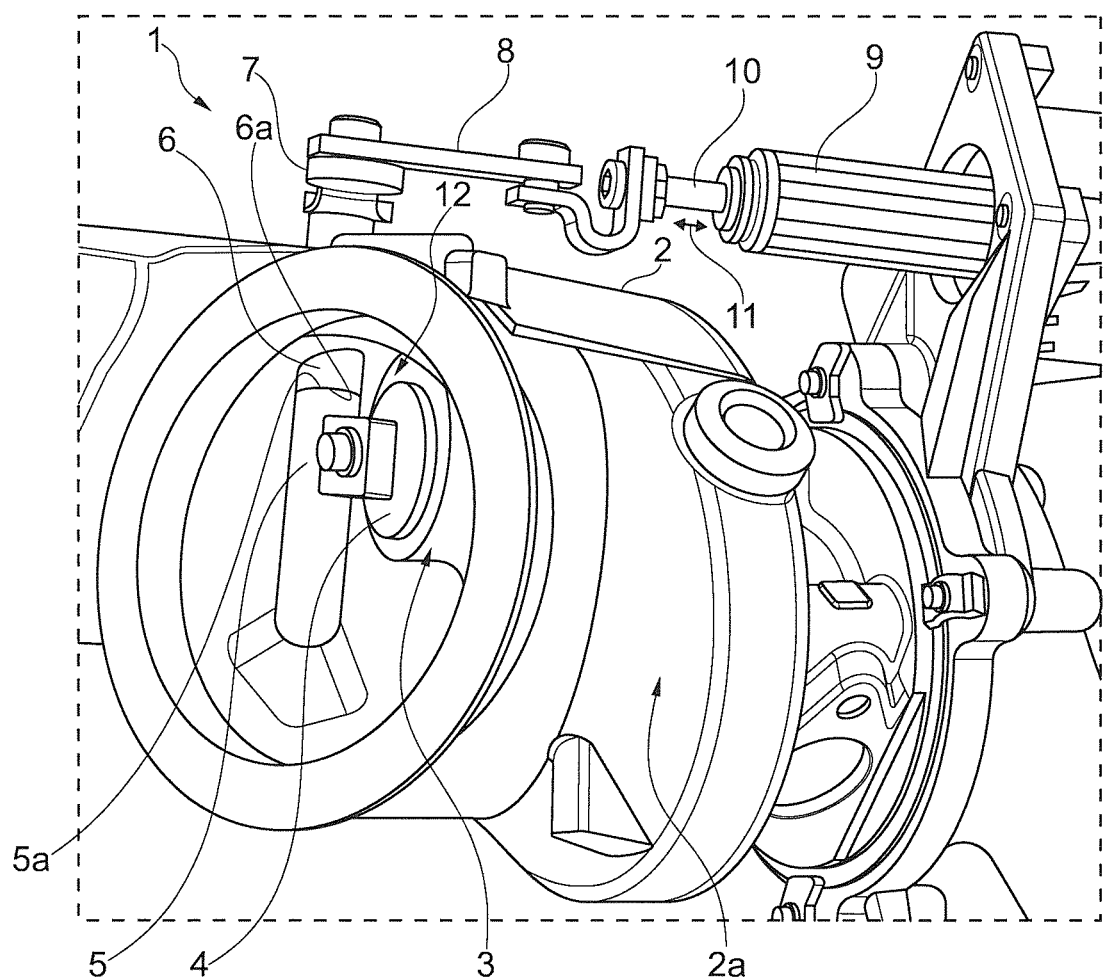
FIG. 1 is a perspective illustration of an exhaust-gas turbocharger according to an embodiment of the invention in the region of the wastegate.

FIG. 1 shows, in a perspective illustration, a subsection of an exhaust-gas turbocharger 1 which has a housing 2. A turbine wheel (not shown here) is arranged in a subregion 2a of the housing 2. The turbine wheel is arranged on a common axis with a compressor wheel (not illustrated).

Hot exhaust gas passing from the internal combustion engine (not illustrated) flows through and drives the turbine wheel. In order to prevent a situation in which the turbine wheel exceeds a predefined rotational speed limit in the presence of high engine speeds of the internal combustion engine, a bypass valve, also referred to as wastegate valve 3, is provided.

The wastegate valve 3 has a pivotably arranged flap 4. In FIG. 1, the wastegate valve 3 is closed. The wastegate valve 3 is opened by virtue of the flap 4 being pivoted. When the wastegate valve 3 is open, a partial volume flow of the hot exhaust gas passing from the internal combustion engine can be conducted directly into the exhaust system (not illustrated) of the vehicle, bypassing the turbine wheel.

The flap 4 of the wastegate 3 is fastened to a flap holder 5. The flap holder 5, in turn, has a pivot spindle 13 (cf. FIG. 2) which extends out of the housing through a bearing bushing 6 which is inserted into the housing 2. The bearing bushing 6 may, for example, be pressed into a corresponding passage bore of the housing 2.

On a section of the pivot axis which projects out of the housing 2, there is arranged a lever 7 which is connected via a linkage 8 to an actuator 9 (for example, an electric positioning motor). By displacement of a positioning member 10 of the actuator 9 in the longitudinal direction 11 of the positioning member 10, the pivot spindle and the flap holder 5 fastened thereto, and the flap 4, which is fastened to said flap holder, of the wastegate, can be pivoted between the closed position shown in FIG. 1 and an open position.

In the case of conventional exhaust-gas turbochargers, the pivot spindle 13 has a certain degree of play with respect to the bearing bushing 6. In the event of a leak-tightness test in which the interior of the housing 2 of the exhaust-gas turbocharger 1 is charged with compressed air, a certain leakage air flow can escape from the housing via said play, which is undesirable, because this impairs the measurement result of the leak-tightness test.

To prevent this, the flap holder 5 or the spindle 13 is sealed off as far as possible, or approximately, in an air-tight (if possible absolutely air-tight) fashion with respect to the bearing bushing 6 or with respect to the housing 2. For this purpose, a seal may be clamped between a face side 6a of the bearing bushing 6 and a face side or a shoulder 5a of the flap holder 5 or a shoulder of the pivot spindle.

The seal may, for example, be a sealing foil. As an alternative to this, it would also be possible for an O-ring, an elastomer disk (for example, a rubber disk) to be provided as a seal. To apply an adequate clamping force, it is for example possible for a clamping element, for example a wedge, a clamping clip or the like to be fitted between the lever 7 and a face side, projecting out of the housing 2, of the bearing bushing 6.

Alternatively or in addition to this, an O-ring 12 may be arranged in the region of the face side 6a of the bearing bushing 6 and the face side 5a of the flap holder 5 or of the pivot spindle, which O-ring is intended to prevent, or substantially prevents, an escape of compressed air during the leak-tightness test.

To ensure a defined seat of the O-ring, an encircling groove-like depression or the like may be provided on the shoulder 5a and/or on the shoulder 6a in the region of contact between the shoulder 5a and the shoulder 6a, into which depression the O-ring is engaged.

Figure 2:
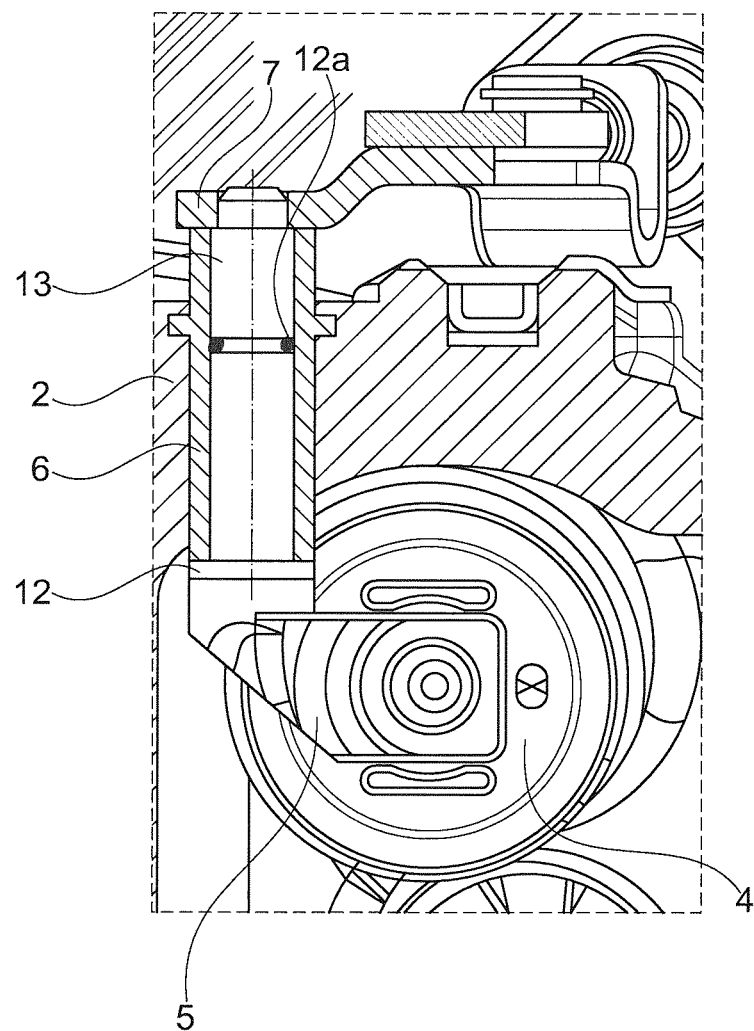
FIG. 2 shows a section through an exhaust-gas turbocharger in the region of the pivot spindle of the wastegate flap.

FIG. 2 shows a cross section through an exhaust-gas turbocharger in the region of the pivot spindle already mentioned above, which is visible and denoted by the reference sign 13 in the sectional illustration shown in FIG. 2. Alternatively to the O-ring 12 already shown in FIG. 1, or in addition thereto, an O-ring 12a may be inserted between an outer circumference of the pivot spindle 13 and an inner circumference of the bearing bushing 6, the latter O-ring sealing off the pivot spindle 13 with respect to the bearing bushing 6 or the housing 2 in air-tight fashion.

The seals 12 and 12a may be designed so as to be burned off during the operation of the exhaust-gas turbocharger owing to the high temperatures prevailing there. The seals 12 and 12a are not required for the function of the exhaust-gas turbocharger itself, but merely ensure, during the leak-tightness test, that is to say before the initial commencement of operation of the exhaust-gas turbocharger 1, that no leakage air flow can escape into the surroundings between the pivot spindle 13 and the bearing bushing 6 or the housing 2.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for testing leak-tightness of an internal combustion engine before initial commencement of operation, the internal combustion engine being equipped with an exhaust-gas turbocharger, the method comprising the acts of:

sealing off an exhaust tract of the internal combustion engine at a location upstream of the exhaust-gas turbocharger;

placing a seal inside of a housing of the exhaust-gas turbocharger, at an actuator of the exhaust-gas turbocharger such that no air can escape from the housing into surroundings of the actuator;

generating a positive pressure in the exhaust-gas turbocharger; and comparing an occurring pressure loss or leakage volume flow with a predefined pressure loss or leakage volume flow, wherein the seal is configured to: i) remain in place during the testing leak-tightness of the internal combustion engine before initial commencement of operation of the internal combustion engine, and ii) be burned-off during the operation of the internal combustion engine.

2. The method according to claim 1, wherein the predefined pressure loss or the leakage volume flow defines an acceptable amount of pressure loss or leakage volume flow for the leak-tightness of the internal combustion engine.

3. An exhaust-gas turbocharger, comprising:

a housing of the exhaust-gas turbocharger, the housing having an exhaust-gas inlet and an exhaust-gas outlet;

a turbine wheel mounted rotatably in the housing; and a wastegate configured to adopt both an open and a closed state, wherein in the open state a fluid connection exists via which exhaust gas passing from the exhaust-gas inlet can flow to the exhaust-gas outlet while bypassing the turbine wheel; and wherein a sealing device is placed inside the housing when the housing is charged with compressed air, wherein the sealing device is configured to: i) remain in place during testing a leaktightness of the exhaust-gas turbocharger before initial commencement of operation of the exhaust-gas turbocharger, and ii) be burned off during the operation of the exhaust-gas turbocharger.

4. The exhaust-gas turbocharger according to claim 3, wherein the exhaust-gas turbocharger is sealed with respect to an exterior of the housing of the exhaust gas turbocharger when the housing is charged with compressed air.

5. The exhaust-gas turbocharger according to claim 3, wherein the wastegate comprises an actuator, at least one component of the actuator is arranged within the housing and at least one component is arranged outside the housing, and the sealing device is provided on the actuation device, the sealing device being configured to seal off in an air-tight manner an interior of the housing with respect to an exterior of the housing.

6. The exhaust-gas turbocharger according to claim 5, wherein the wastegate comprises a wastegate valve or wastegate flap that is actuatable via actuation of the actuator that extends through an opening providing in the housing.

7. The exhaust-gas turbocharger according to claim 6, wherein the sealing device bears against the acutation element and against at least one of the housing, and a bearing element fixedly connected to the housing.

8. The exhaust-gas turbocharger according to claim 7, wherein the bearing element is formed by a bushing fixedly connected to the housing.

9. The exhaust-gas turbocharger according to claim 7, wherein the bearing element is pressed into the housing.

10. The exahust-gas turbocharger according to claim 8, wherein the bearing element is pressed into the housing.

11. The exhaust-gas turbocharger according to claim 7, wherein the bearing element and the acutation element each have an encircling groove depression, and
the sealing device is inserted into the groove depressions.

12. The exhaust-gas turbocharger according to claim 7, wherein the bearing element and the actuation element are spaced apart from one another by a gap width, and
the gap width forms a groove depression wherein the sealing device is inserted into the groove depression formed by the gap width.

13. The exhaust-gas turbocharger according to claim 7, wherein the sealing device is arranged between an outer circumference of the at least one component of the actuator arranged outside the housing and an inner circumference of a passage opening provided on the bearing element.

14. The exhaust-gas turbocharger according to claim 5, wherein the sealing device has an annular seal.

15. The exhaust-gas turbocharger according to claim 14, wherein the annular seal is an O-ring seal.

16. The exhaust-gas turbocharger according to claim 7, wherein the sealing device is arranged on or between a face side of the actuation element and the housing, or on or between a face side of a radially protruding shoulder of the actuation element and a face side of a bearing element fixedly connected to the housing, wherein the sealing device comprises a sealing foil, an O-ring seal, or an elastomer disc.

17. The exhaust-gas turbocharger according to claim 16, wherein the actuation element is braced via a clamping element such that the shoulder of the actuation element is pressed against the sealing device.

18. The exhaust-gas turbocharger according to claim 5, wherein
the sealing device comprises a seal provided on a new, unused, exhaust-gas turbocharger, the seal being configured to be burned-off due to high temperatures of the exhaust-gas.

19. A method for texting leak-tightness of an internal combustion engine before initial commencement of operation, the internal combustion engine being equipped with an exhaust-gas turbocharger, the method comprising the acts of:
sealing off an exhaust tract of the internal combustion engine at a location upstream of the exhaust-gas turbocharger;
placing a seal inside of a housing of the exhaust-gas turbocharger, in an area of the housing that is adjacent to a wastegate valve, such that no air can escape from the housing into the surroudings, the area of the housing being an area in which the seal is exposed to exhaust gas generated by the internal combusion engine during operation thereof;
generating a positive pressure in the exhaust-gas turbocharger; and
comparing an occurring pressure loss or leakage volume flow with a predefined pressure loss or leakage volume flow, wherein
the seal is configured to: i) remain in place during the testing leak-tightness of the internal combustion engine before initial commencement of operation of the internal combustion engine, and ii) be burned-off during the operation of the internal combustion engine.

* * * * *